(12) United States Patent
Feeney et al.

(10) Patent No.: US 9,796,117 B2
(45) Date of Patent: Oct. 24, 2017

(54) APPARATUS FOR FORMING A FLANGE

(71) Applicant: GKN Aerospace Services Structures Corporation, Cromwell, CT (US)

(72) Inventors: Christopher J. Feeney, Wallingford, CT (US); Steven Robert Hayse, Prospect, CT (US); David Andrew Rogozinski, Bristol, CT (US)

(73) Assignee: GKN Aerospace Services Structures Corporation, Cromwell, CT (US)

( * ) Notice: Subject to any disclaimer, the term of this patent is extended or adjusted under 35 U.S.C. 154(b) by 619 days.

(21) Appl. No.: 14/295,081

(22) Filed: Jun. 3, 2014

(65) Prior Publication Data

US 2015/0343716 A1    Dec. 3, 2015

(51) Int. Cl.
*B29C 33/20*   (2006.01)
*B29C 70/48*   (2006.01)
*B29C 70/54*   (2006.01)
*B29C 57/06*   (2006.01)
*B29C 70/44*   (2006.01)
*B29K 105/08*  (2006.01)
*B29L 31/30*   (2006.01)

(52) U.S. Cl.
CPC .......... *B29C 33/202* (2013.01); *B29C 57/06* (2013.01); *B29C 70/44* (2013.01); *B29C 70/48* (2013.01); *B29C 70/541* (2013.01); *B29C 70/543* (2013.01); *B29C 70/545* (2013.01); *B29C 2033/205* (2013.01); *B29K 2105/089* (2013.01); *B29K 2883/00* (2013.01); *B29L 2031/3076* (2013.01)

(58) Field of Classification Search
None
See application file for complete search history.

(56) References Cited

U.S. PATENT DOCUMENTS

| | | |
|---|---|---|
| 3,651,661 A | 3/1972 | Darrow |
| 4,551,085 A | 11/1985 | Epel et al. |
| 5,151,236 A | 9/1992 | Azzara et al. |
| 5,318,647 A | 6/1994 | Mitchell |
| 5,468,331 A | 11/1995 | Makarenko et al. |
| 5,639,535 A | 6/1997 | McCarville |
| 5,648,109 A | 7/1997 | Gutowski et al. |
| 7,335,012 B2 | 2/2008 | Blanton et al. |
| 8,460,502 B2 | 6/2013 | Bergmann et al. |
| 8,535,042 B1 | 9/2013 | Kirkpatrick et al. |

(Continued)

FOREIGN PATENT DOCUMENTS

| | | |
|---|---|---|
| EP | 2682245 A2 | 1/2014 |
| GB | 2486231 A | 6/2012 |

OTHER PUBLICATIONS

International Search Report and Written Opinion for PCT/US2015/031922 dated Aug. 11, 2015 (9 pages).

*Primary Examiner* — Benjamin Schiffman
(74) *Attorney, Agent, or Firm* — Bejin Bieneman PLC (57) ABSTRACT

An apparatus for forming a flange has a laminate component and a drum supporting the laminate component. A forming tool selectively engages the laminate component. A diaphragm member extends between the drum and the laminate component and selectively engages the forming tool. Movement of the diaphragm member deforms the laminate component away from the drum about an edge of the forming tool, and the laminate component maintains a substantially uniform thickness.

14 Claims, 9 Drawing Sheets

(56) References Cited

U.S. PATENT DOCUMENTS

| | | |
|---|---|---|
| 8,556,618 B2 | 10/2013 | Bergmann |
| 2008/0060755 A1 | 3/2008 | Blanton et al. |
| 2008/0157418 A1 | 7/2008 | Blanton et al. |
| 2009/0308477 A1 | 12/2009 | Geislinger et al. |
| 2010/0207304 A1 | 8/2010 | Kirkpatrick |
| 2012/0270006 A1 | 10/2012 | Mcmillan |
| 2013/0115429 A1 | 5/2013 | Valle |
| 2013/0160257 A1 | 6/2013 | Feeney et al. |
| 2013/0164473 A1 | 6/2013 | Feeney et al. |
| 2013/0164492 A1 | 6/2013 | Hayse |
| 2013/0164503 A1 | 6/2013 | Hayse |
| 2013/0266431 A1 | 10/2013 | Moram et al. |
| 2014/0010986 A1* | 1/2014 | Kirkpatrick ............. B29C 70/44 428/64.1 |

* cited by examiner

APPARATUS FOR FORMING A FLANGE

BACKGROUND

Aircraft engine case structures are one of a variety of structures that typically incorporate an outward facing flange for joining one case to another component or hardware. In such a structure made from laminated composite materials, it is desirable, but currently difficult, to achieve uniform quality for the entirety of the outward facing flange. For example, many current methods of producing composite cases such as winding, wrapping, braiding, tape laying, etc., typically involve first producing a fibrous cylinder and then bending the edge of the cylinder to form a flange. By their nature, fibrous composite materials tend to disorganize themselves when such a local or discontinuous force is applied to them, greatly complicating uniform flange formation.

DETAILED DESCRIPTION

An apparatus and a method for forming a flange are disclosed, whereby it is possible to efficiently achieve substantially uniform quality for the entirety of an outward facing flange. An apparatus and a method for forming a flange according to the present disclosure include a laminate component and a drum supporting the laminate component. In an apparatus and method for forming a flange according to the present disclosure, a forming tool selectively engages the laminate component, and a diaphragm member extends between the drum and the laminate component and selectively engages the forming tool. Movement of the diaphragm member deforms the laminate component away from the drum about an edge of the forming tool, and the laminate component maintains a desired fiber architecture. An apparatus and a method for forming a flange according to the present disclosure provide advantages such as avoiding flaws such as wrinkles, folds, fiber waviness, fiber buckling, and consolidation in the corner.

For example, an apparatus for forming a flange may comprise a laminate component, e.g., an engine case component, having at least a first layer and a second layer in a first position relative to each other. The laminate component further has a main section and a first end. A drum supports the laminate component. A diaphragm member extends between the drum and the laminate component, the diaphragm member overlapping the first end and at least a portion of the main section of the laminate component, the diaphragm member having a first end extending outside of the laminate component proximate to the first end of the laminate component. The laminate component could include a composite material, e.g., one of carbon fiber, aramid fiber, ceramic fiber, and glass fiber materials, and/or a braided composite material and/or a woven composite material. The apparatus further comprises a forming tool having a forming edge and a forming surface angled relative to the drum, the forming tool selectively engaging the forming edge with the main portion of laminate component proximate the first end of the laminate component and opposite the diaphragm member and the drum. The first end of the diaphragm member is configured to move away from the drum and selectively engage the forming tool, the diaphragm member being configured to deform the first end of the laminate component away from the drum about the forming edge of the forming tool, the first and second layers of the laminate component being configured to displace to a second position relative to each other, the laminate component having a substantially uniform thickness between the first and second layers in the second position.

The apparatus may further comprise a former member extending between the diaphragm member and the laminate component, the former member having a rigidity greater than each of the diaphragm member and the laminate component, wherein, when the first end of the diaphragm member moves away from the drum, the former member translates the movement of the diaphragm member to the laminate component to deform the first end of the laminate component about the forming edge of the forming tool. In some cases, the former member includes an elastomeric silicone material.

The apparatus may further comprise a seal layer extending over the main section of the laminate component and between the forming tool and the drum, wherein the forming tool sealingly engages the laminate component and the diaphragm member relative to the drum, and the first end of the diaphragm member has a sealed selective engagement with the forming tool, and wherein the forming tool, diaphragm member and drum define a sealed forming chamber therebetween encompassing the laminate component. A vacuum may be provided in fluid communication with the sealed forming chamber, the vacuum configured to selectively reduce the pressure in the chamber and the diaphragm member further deforming the first end of the laminate component away from the drum about the forming edge of the forming tool, the first and second layers of the laminate component displacing to a third position relative to each other, the laminate component having a substantially uniform thickness between the first and second layers in the third position.

The apparatus may further comprise a mold plate selectively engaged with the forming tool and the drum, the mold plate cooperating with the forming tool and the drum to support the laminate component, which could be cured with a resin, in a desired shape.

In a further example, a method for forming a flange comprises supporting a laminate component, e.g., an engine component, on a drum, overlapping the laminate component with a diaphragm member disposed on the drum, clamping a first portion of the laminate component and a first portion of the diaphragm member on the drum with a forming tool, moving a second portion of the diaphragm member away from the drum, deforming a second portion of the laminate component about an edge of the forming tool, and maintaining a desired fiber architecture for the laminate component.

The method may further comprise providing a former member between the diaphragm member and the laminate component, the former member having a rigidity greater than each of the diaphragm member and the laminate component; and translating the movement of the second portion of the diaphragm member away from the drum to the laminate component to deform the second portion of the laminate component about the edge of the forming tool.

The method may further comprise sealing the laminate component in a chamber between the drum, the diaphragm member, and the forming tool, and applying a vacuum to the chamber to deform the second portion of the laminate component into the forming tool.

The method may further include any one or more of curing or trimming the laminate component.

In the exemplary method, maintaining the desired fiber architecture for the laminate component may include maintaining a thickness of the laminate component.

In the exemplary method, maintaining the desired fiber architecture for the laminate component may include avoiding wrinkles, folds, fiber waviness and fiber buckling in the laminate component.

Figure 1:
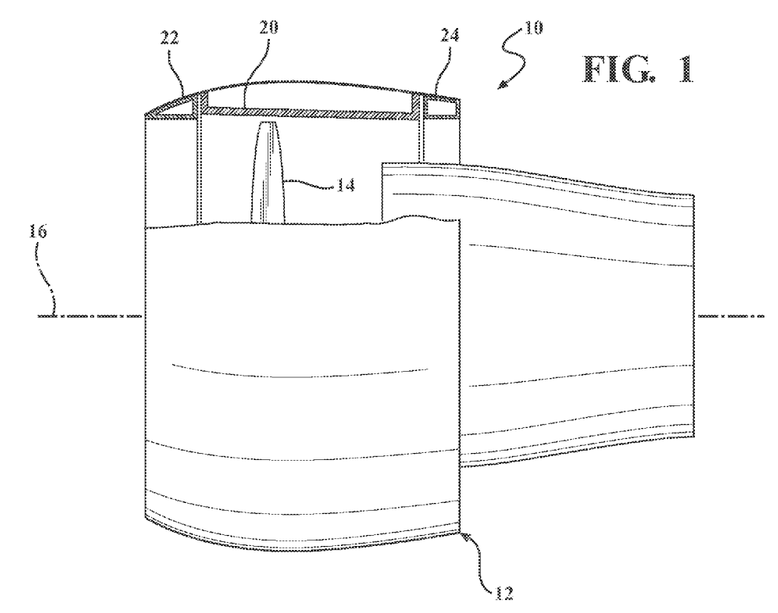
FIG. 1 is a side, partial cut-away view of an exemplary fan engine assembly.

FIG. 1 is a side, partial cut-away view of an exemplary fan engine assembly 10. It will be appreciated that the fan engine assembly 10 is generally configured for attachment to and cooperation with a vehicle such as an aircraft. A case 12 covers an engine fan 14, which rotates about an engine axis 16. The case 12 has a plurality of components, including a fan containment case 20, as well as a first edge component 22 and a second edge component 24 coupled on opposing sides of the fan containment case 20.

Figure 2:
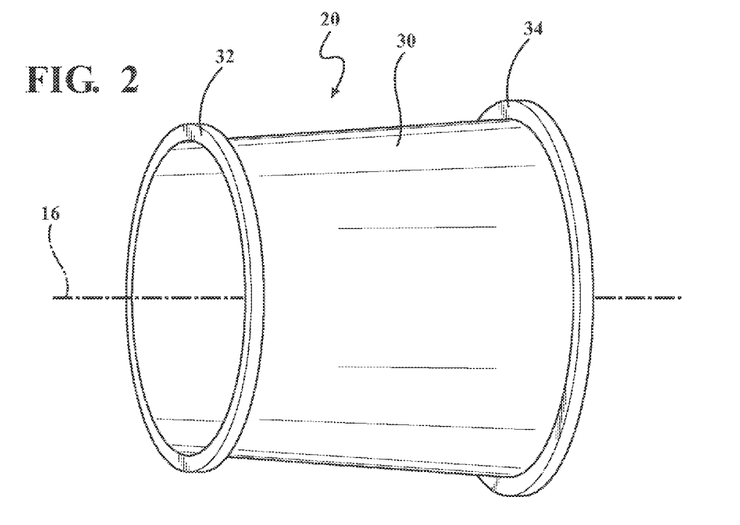
FIG. 2 is a perspective view of an exemplary engine case component.

FIG. 2 is a perspective view of the fan containment case 20. As shown in this exemplary illustration, the fan containment case 20 is a generally cylindrical body oriented about engine axis 16. The fan containment case 20 includes a main housing portion 30, a first end flange 32, and a second end flange 34 located opposite the first end flange 32. First and second end flanges 32 and 34 extend radially outwardly away from main housing portion 30. Referring also to FIG. 1, first and second end flanges 32 and 34 are configured to receive fasteners (not illustrated) for respectively coupling first and second edge components 22, 24 of case 12 to fan containment case 20.

Figure 3:
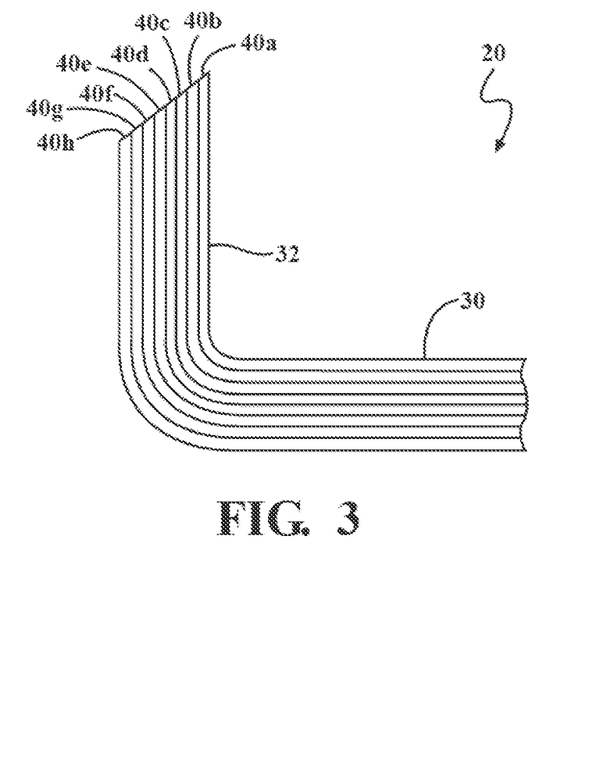
FIG. 3 is a partial cross-sectional view of a flange of an exemplary engine case component.

FIG. 3 is a cross-sectional view of first end flange 32 of fan containment case 20. The fan containment case 20 includes a laminate material with a plurality of layers 40a-40h. The layers 40a-40h are respectively displaced relative to each other at the radially outward end of first end flange 32. Where the layers 40a-40h overlap in both the first end flange 32 and the main housing portion 30, the fan containment case 20 has a desired fiber architecture, such as a substantially uniform thickness and a profile free of wrinkles, folds, fiber waviness, fiber buckling, and consolidation in the corner. It will be appreciated that suitable laminate materials include, for example, braided or woven composite materials including materials such as carbon fiber, aramid fiber, ceramic fiber, and glass fiber, non-woven composite materials including aramid fiber, glass fiber, or ceramic fiber materials, as well as additional known laminate materials and configurations for aircraft engine case applications.

Figure 4:
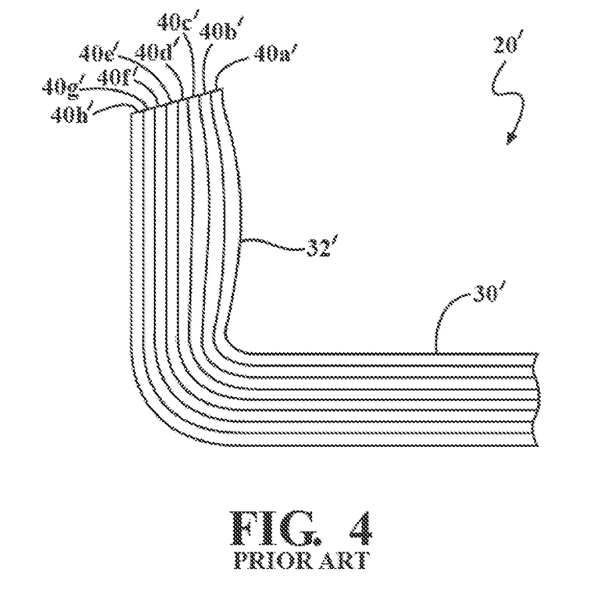
FIG. 4 is a partial cross-sectional view of a prior flange for an engine case component.

FIG. 4 is a cross-sectional view of a prior flange 32' for an engine case component 20'. The component comprises layers 40a'-40h'; during formation of flange 32', at least some of the layers 40a'-40h' radially bulge, and the component 20' does not have a uniform thickness. The apparatus and method for forming a flange disclosed herein avoid such configurations and provide components with flanges having desired fiber architecture, such as substantially uniform thicknesses and a configuration free of wrinkles, folds, fiber waviness, fiber buckling, and consolidation in the corner.

Figure 5:
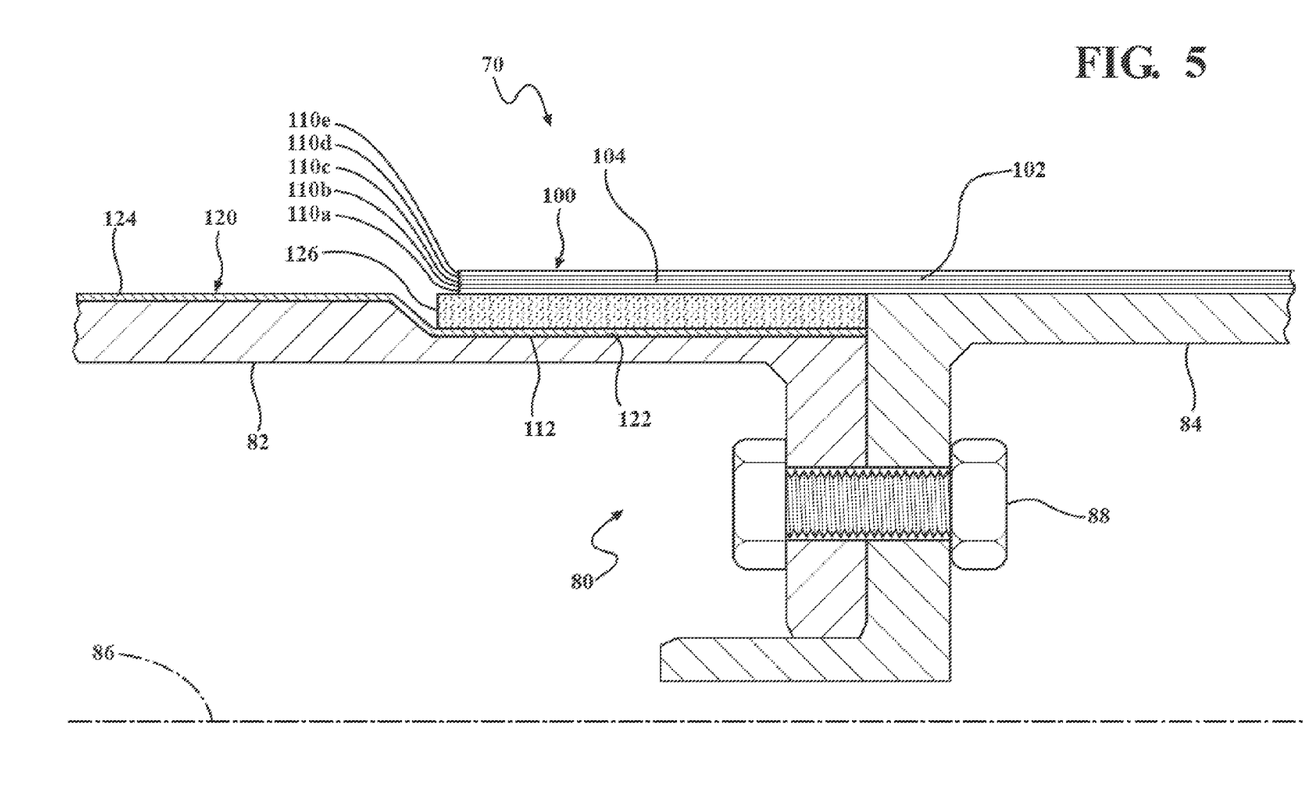
FIG. 5-11 are partial cross-sectional views of an exemplary flange-forming apparatus.

FIG. 5 is a cross-sectional view of an exemplary flange-forming apparatus 70. Flange-forming apparatus 70 includes a drum assembly 80 with first and second drum components 82 and 84 configured about axis 86. First and second drum components 82 and 84 are selectively fastened together in the axial direction by one or more bolts 88.

Figure 6:
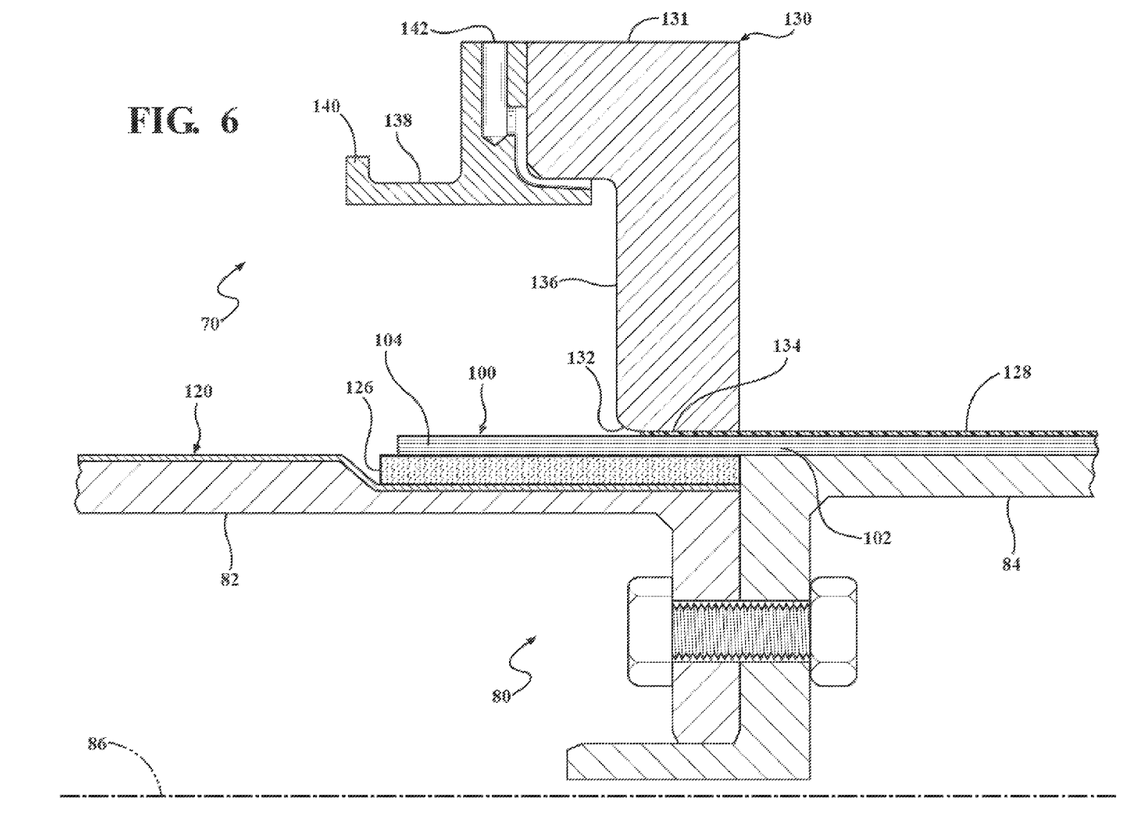

A laminate component 100 extends around and is supported by drum assembly 80. The laminate component 100 includes a plurality of layers 110a-110e wrapped around drum assembly 80. The laminate component 100 defines a main section 102 and a first end section 104. As shown in FIGS. 5-6, the laminate component 100 is in a generally radially flat configuration with a substantially uniform radial thickness, with layers 110a-110e in a first position generally aligned relative to each other. As disclosed above with reference to FIG. 3, it will be appreciated that suitable laminate materials for the laminate component 100 include braided, composite materials such as multi-ply carbon fiber and glass, as well as additional known laminate materials and configurations thereof. The first drum component 82 includes a radially inwardly extending forming groove 112 proximate second drum component 84. The drum assembly 80 supports the laminate component 100 such that the laminate component 100 engages second drum component 84 and first end section 104 of laminate component 100 axially overlaps forming groove 112 of first drum component 82. It will be appreciated that the laminate component 100 may be trimmed, such as at the first end section 104, by known methods in the configuration illustrated in FIG. 5, as well as after further operation of the flange forming apparatus 70, to a size corresponding to the desired structure that is to include the laminate component.

The flange forming apparatus 70 further includes an elastomeric diaphragm member 120. The diaphragm member 120 extends around and engages the radially-outward surface of first drum component 82. The diaphragm member 120 includes a main portion 122 overlapping the forming groove 112 of first drum component 82, and a first end portion 124 extending axially away from the forming groove 112 opposite the second drum component 84. The main portion 122 of the diaphragm member 120 extends radially between first drum component 82 and the laminate component 100. It will be appreciated that the diaphragm member 120 may include one or more of a variety of known elastomeric materials, such as elastomeric silicone and plastic.

The flange forming apparatus 70 further includes a former 126 extending about the axis 86, axially overlapping the forming groove 112 of first drum component 82, and disposed radially between the diaphragm member 120 and the laminate component 100. The former 126 is relatively rigid compared to each of the diaphragm member 120 and the laminate component 100. It will be appreciated that the former 126 may include one or more of a variety of materials, including elastomeric silicone, nylon and aluminum. It will also be appreciated that the former 126 may have a variety of configurations, such as a plurality of layers, for one example. In another example, the former 126 is ⅜ inches radially thick and the laminate component is ¼ inches radially thick FIG. 6 is an exemplary cross-sectional view of the flange-forming apparatus 70 with additional components illustrated, including a first vacuum bag 128 and a forming tool assembly 130 each also extending about the axis 86. The first vacuum bag 128 has a sealed engagement with the laminate component 100 and extends over the main section 102 of the laminate component 100 to proximate the first end section 104. In the opposite axial direction, the first vacuum bag 128 extends beyond the laminate component 100 to overlap with second drum component 84 (not shown). The first vacuum bag 128 has a sealed engagement with second drum component 84, such as with a known adhesive tape material (not shown).

The forming tool assembly 130 includes a main component 131 with a forming edge 132, an axially-extending clamping surface 134, and a radially-extending forming surface 136. The forming tool assembly 130 is positioned radially outward of drum assembly 80, such that the clamping surface 134 axially overlaps the forming groove 112 of first drum component 82, the main portion 122 of the diaphragm member 120, the former 126, the main section 102 of the laminate component 100 proximate first end section 104, and the first vacuum bag 128. The main component 131 has a sealed engagement between the clamping surface 134 and the first vacuum bag 128, which can be provided or reinforced with an adhesive tape (not shown) applied between the main component 131 and the first vacuum bag 128 opposite the forming surface 136. It will be appreciated that the forming tool assembly 130 and its components may vary in configuration and shape to provide for a variety of forming applications.

The forming tool assembly 130 further includes a vacuum cap member 138 fixed to main component 131 and extending axially away from the forming surface 136. The vacuum cap member 138 includes a flange 140 and has a vacuum channel 142 extending therethrough.

Figure 7:
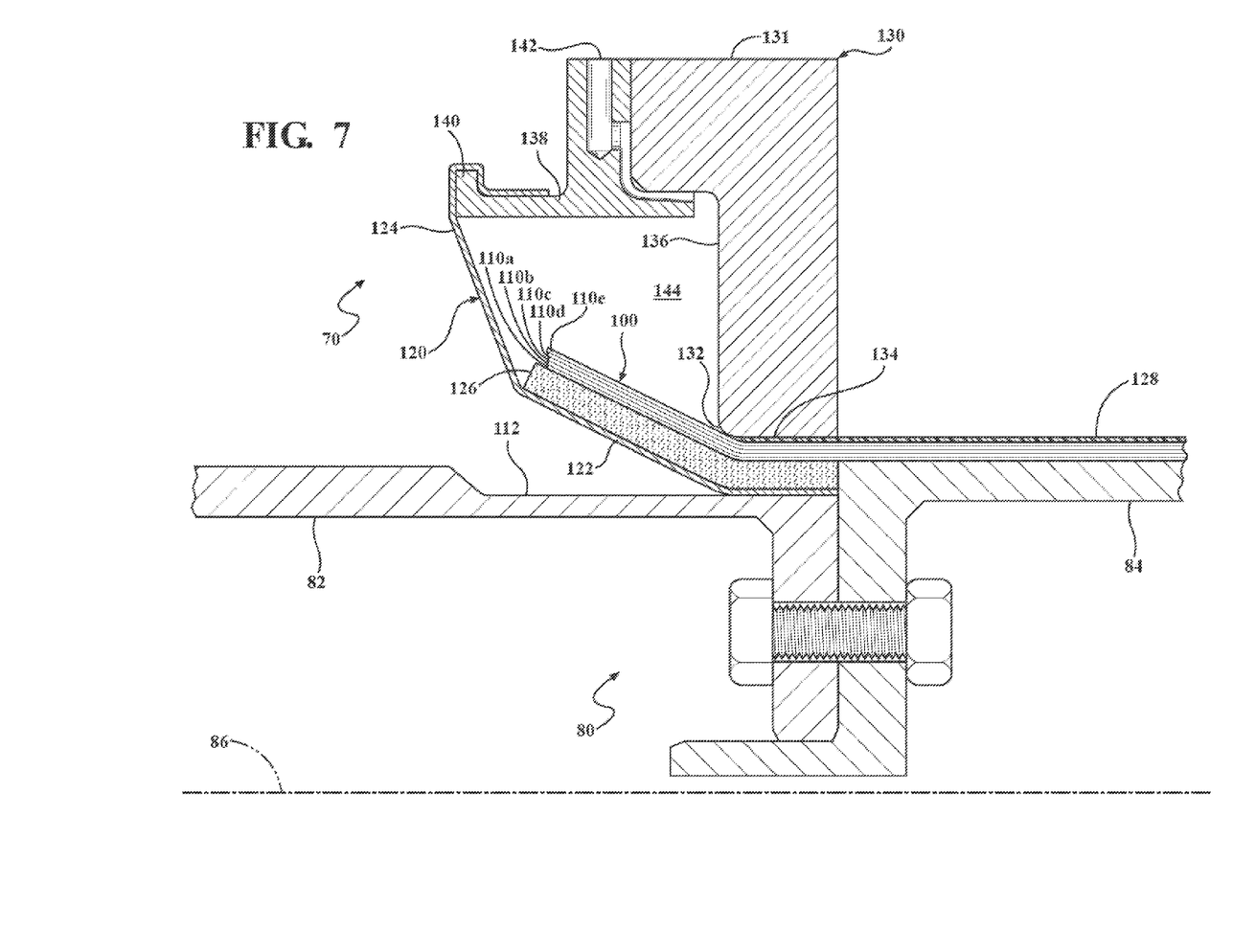

FIG. 7 is a cross-sectional view of the flange-forming apparatus 70 in an exemplary operating configuration. The diaphragm member 120 is pulled radially away from first drum component 82 such that the first end portion 124 extends over the flange 140 of the vacuum cap member 138 of the forming tool assembly 130. The first end portion 124 of the diaphragm member 120 is secured to the vacuum cap member 138 with, for example, a fastener such as a hook (not shown), or, in another example, through the friction or grip provided by the elastomeric stretch of the diaphragm member 120, and a forming chamber 144 is defined between the forming tool assembly 130 and the diaphragm member 120, with the former 126 and the laminate component 100 extending therewithin. The forming chamber 144 is in fluid communication with the vacuum channel 142.

With the ends of the main portion 122 of the diaphragm member 120 and the former 126 clamped between the first drum component 82, on one side, and the laminate component 100, the first vacuum bag 128, and the main component 131 of the forming tool assembly 130, on the other, the radially outward movement of the diaphragm member 120 deflects the former 126 and, in turn, the first end section 104 of the laminate component 100 radially outwardly from the first drum component 82 toward main component 131 of the forming tool assembly 130. The laminate component 100 engages with the forming edge 132 of the main component 131 of the forming tool assembly 130 and deforms about the forming edge 132. The relatively rigid former 126 translates the force from the radially outward movement of the elastic diaphragm member 120 and focuses it at the engagement between the laminate component 100 and the forming edge 132. With the deformation force consolidated at the engagement between the laminate component 100 and the forming edge 132, the laminate component 100 deforms from that engagement out toward the first end section 104, and the layers 110a-110e of the laminate component 100 displace relative to each other. Through this booking-type of displacement, the layers 110a-110e maintain a substantially uniform thickness in the areas in which they continue to overlap. Due to the absence of pressure applied to the laminate layers 110a-110e in the first end section 104 of the laminate component 100, the layers 110a-110e in the first end section 104 are permitted to displace substantially separately as required to substantially avoid flaws such as wrinkles, folds and buckling and towards maintaining a substantially uniform thickness.

Figure 8:
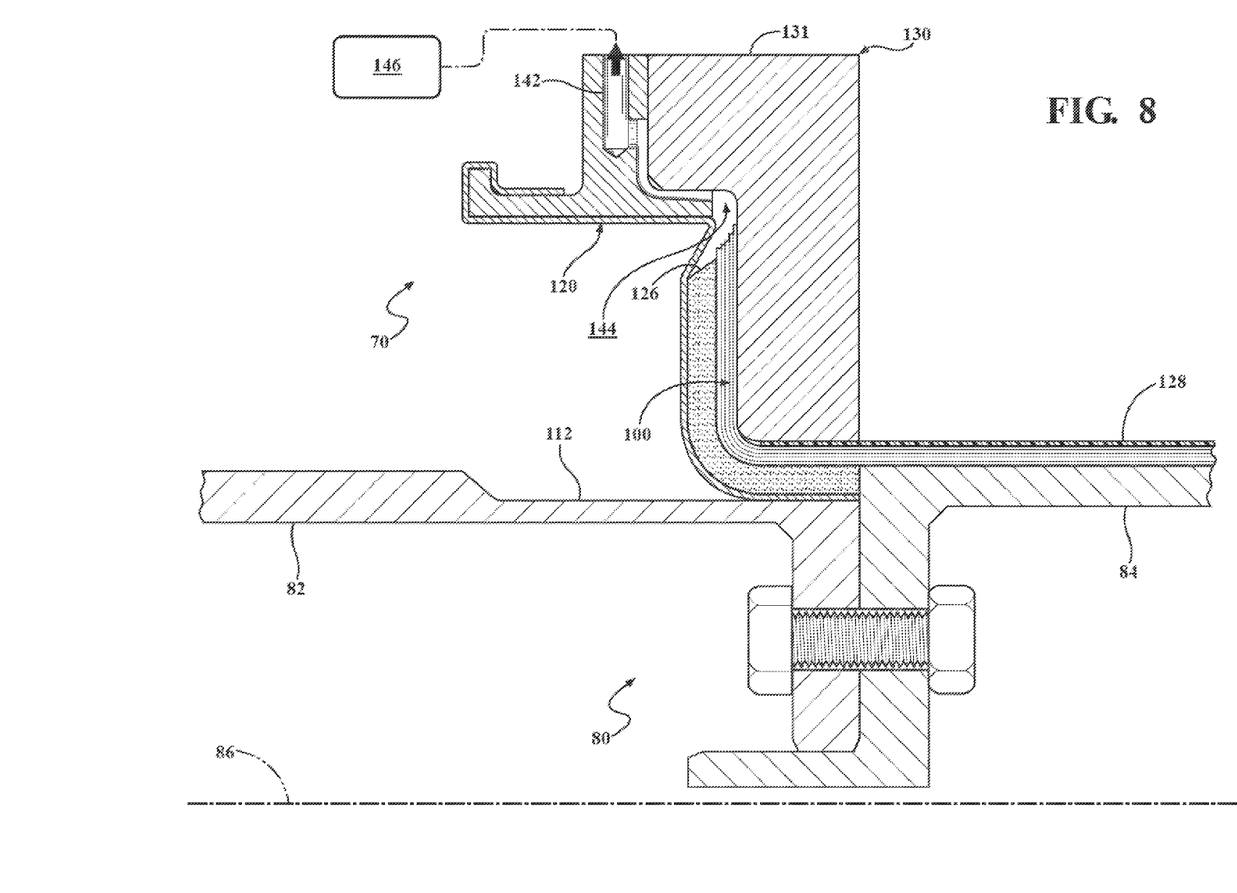

FIG. 8 is a cross-sectional view of the flange-forming apparatus 70 in a further exemplary operating configuration. The flange-forming apparatus 70 includes a vacuum 146 (illustrated schematically) fluidly coupled to the vacuum channel 142 and, in turn, the forming chamber 144. The vacuum 146 operates to reduce the pressure in forming chamber 144 such that the first end portion 124 of the diaphragm member 120 is pulled into contact with the vacuum cap member 138 of the flange forming assembly 130. The movement of main portion 122 of the diaphragm member 120 is translated through the former 126 to the laminate component 100 to continue deformation of the laminate component 100 about the forming edge 132 until the laminate component 100 contacts the forming surface 136. The layers 110a-110e of the laminate component 100 continue to displace relative to each other and maintain a substantially uniform thickness in the areas in which they continue to overlap. The laminate component 100 can be cured while in this apparatus if desired by the curing of a resin matrix, or through the use of additional mold tooling as described with respect to FIGS. 9-11.

Figure 9:
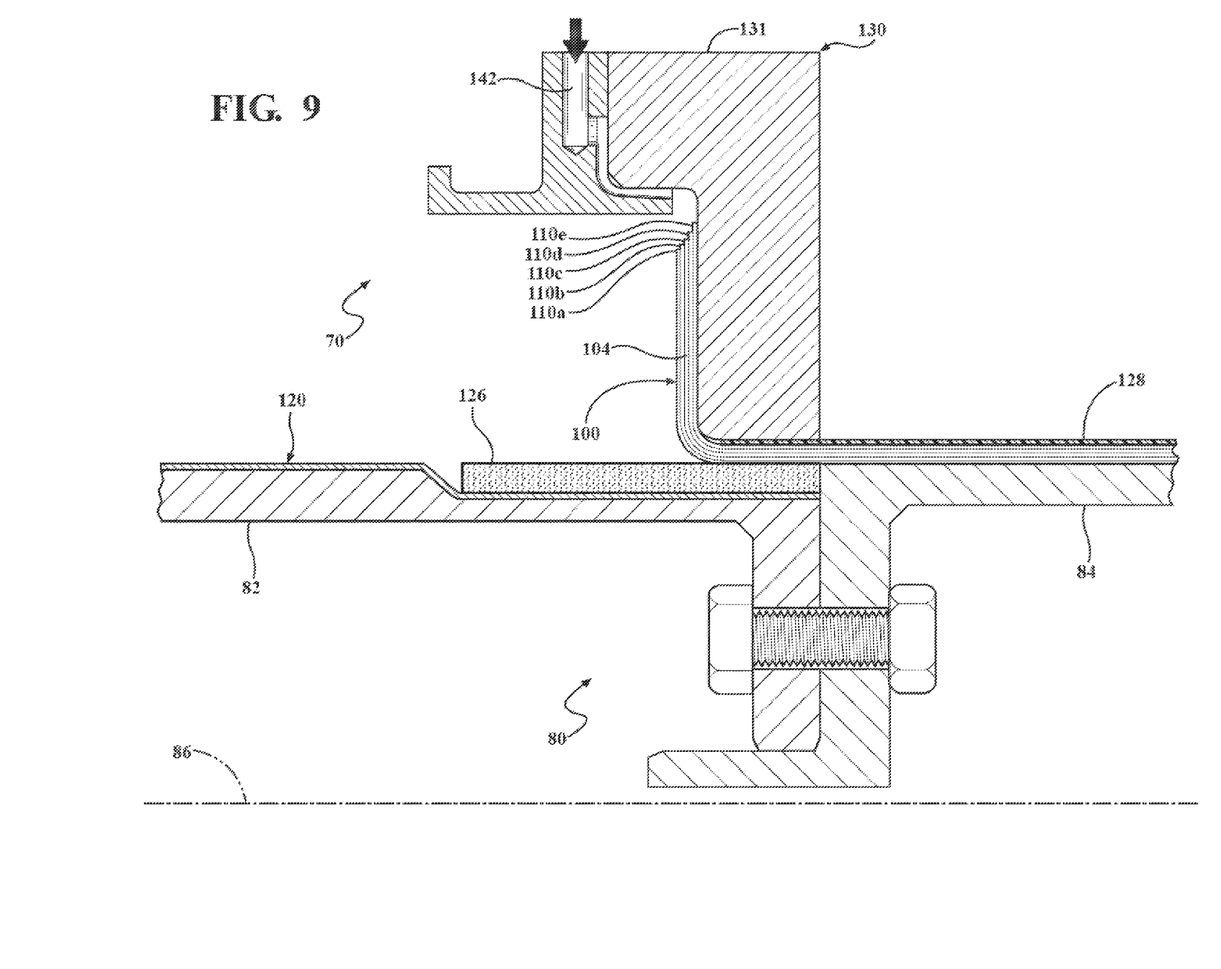
Figure 10:
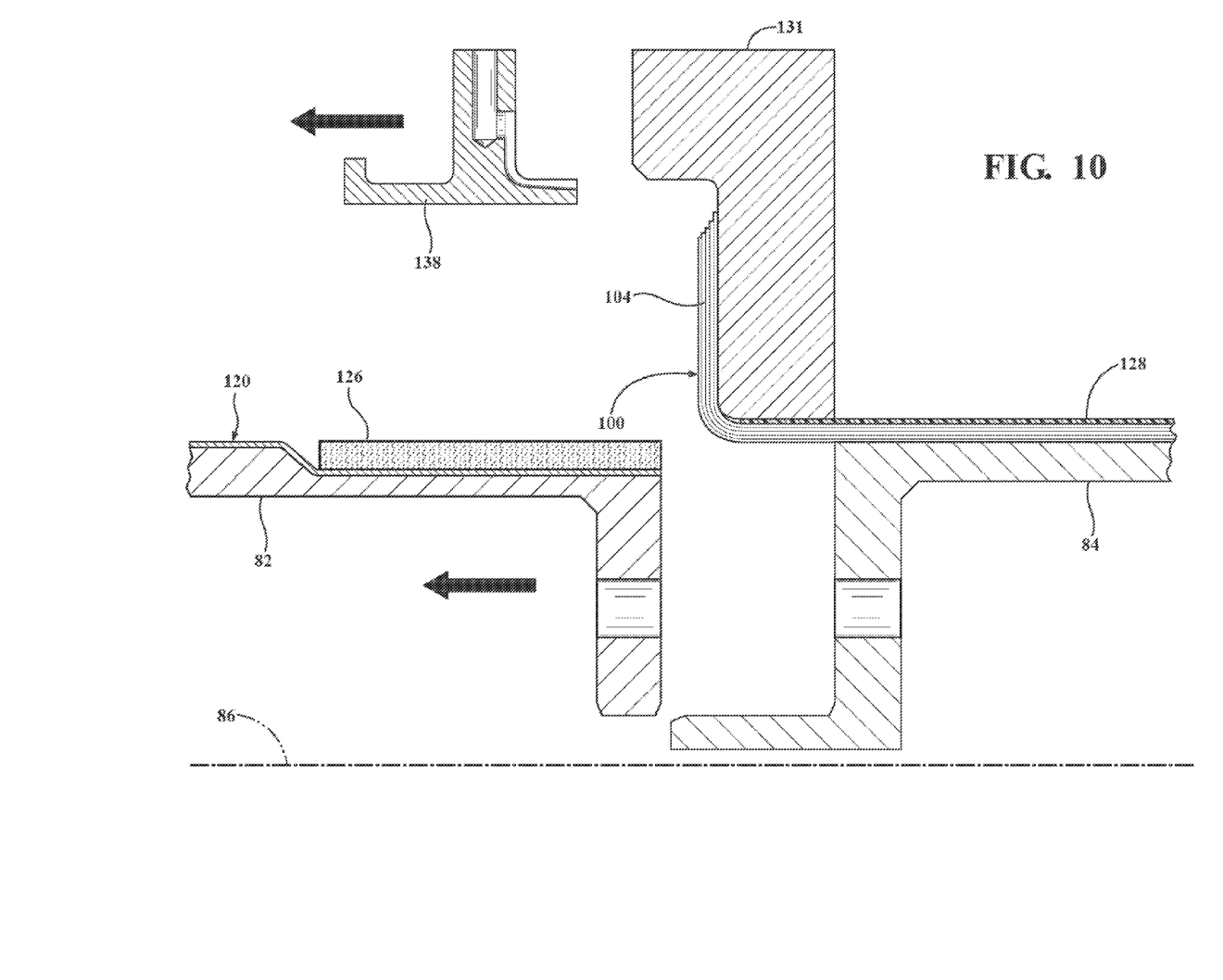

FIGS. 9-10 are cross-sectional views of the flange-forming apparatus 70 in further exemplary operating configurations. The forming chamber (FIGS. 7-8) is re-pressurized through the vacuum channel 142, and the diaphragm member 120 is de-coupled from the vacuum cap member 138. The diaphragm member 120 and the former 126 disengage from the deformed first end section 104 of the laminate component 100 and return to radially adjacent positions to first drum component 82. First drum component 82 is de-attached from second drum component 84, and the vacuum cap member 138 is de-attached from the main component 131 of the forming tool assembly 130.

Figure 11:
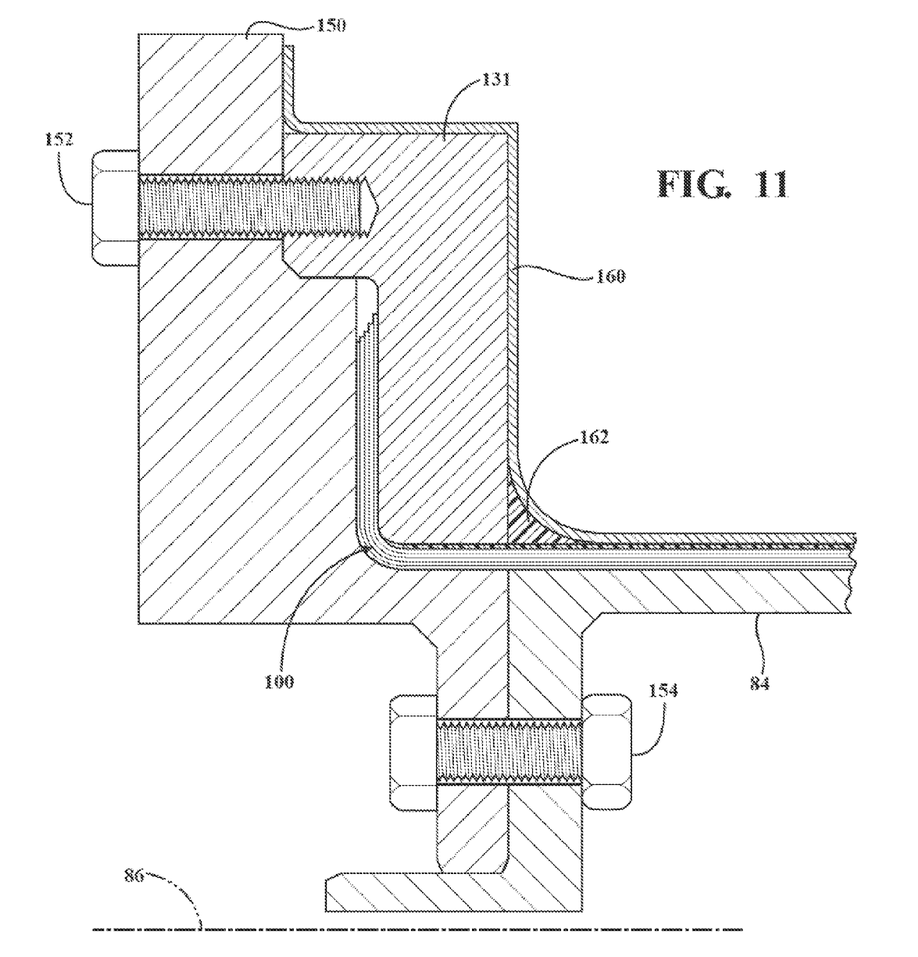

FIG. 11 is an exemplary cross-sectional view of the flange-forming apparatus 70 with additional components illustrated, including a mold plate 150 extending about the axis 86. The mold plate 150 is fastened to the main component 131 of the forming tool assembly 130 and the second drum component 84 with bolts 152, 154, respectively. The mold plate 150 is shaped complementary to the second drum component 84 and the main component 131 to secure the deformed laminate component 100 therebetween. A second vacuum bag 160 is secured over the main component 131, the first vacuum bag 128 and the laminate component 100 to provide a seal over all of these components between the mold plate 150 and the radially outward surface of the second drum component 84 (not shown). The flange-forming apparatus 70 further includes a mold support between the second vacuum bag 160, on one side, and the main component 131 and the first vacuum bag 128, on the other. A resin (not shown) is applied to the laminate component 100. Resin is applied by any of a variety of resin infusion methods as practiced in the industry for infusing composite laminate, including, but not limited to, resin transfer molding, resin film infusion, and vacuum assisted resin transfer molding; by the use of resin pre-impregnated materials that allow substantially little tack between layers 110a-110e; or when the flange forming process is executed in a warm condition, such as in an oven, whereby the pre-impregnated layers are substantially fluid enough to allow the relative displacement of layers 110a-110e.

Figure 12:
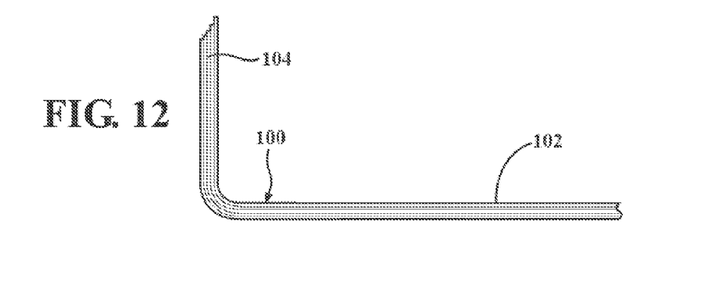
FIG. 12 is a partial cross-sectional view of a flange of another exemplary engine case component.

FIG. 12 is a partial cross-sectional view of the laminate component 100 with first end section 104 deformed into a flange and cured with resin, for use in an application such as an engine case component for an aircraft. The layers 110a-110e maintain a desired fiber architecture, e.g. a substantially uniform thickness and a profile free of wrinkles, folds, fiber waviness, fiber buckling, and consolidation in the corner, in the areas in which they overlap.

As discussed herein, FIGS. 5-11 also illustrate a method for forming a flange on an engine case component. The laminate component 100 is supported on the drum assembly 80 so as to overlap with the diaphragm member 120 disposed on the first drum component 82. The former 126 extends between the diaphragm member 120 and the laminate component 100, and the former 126 has a rigidity greater than each of the diaphragm member 120 and the laminate component 100. The forming tool assembly 130 clamps a portion of the laminate component 100 and a portion of the diaphragm member 120, along with a portion of the former 126, to the drum assembly 80. The first end portion 124 of the diaphragm member 120 moves away from the first drum component 82. The former 126 translates that movement to deform the first end section 104 of the laminate component 100 about the forming edge 132 of the forming tool assembly 130. The layers 110a-e displace relative to each other to maintain a thickness for the laminate component 100. The laminate component 100 is sealed in the forming chamber 144 and the vacuum 146 reduces the pressure in the chamber 144 to deform the laminate component 100 into the forming surface 136 of the forming tool assembly 130. The laminate component is supported between the main component 131 of the forming tool assembly 130, the second drum component 84, and the mold plate 150, and cured with a resin. The laminate component may be trimmed as required or desired (not shown).

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

In examples disclosed herein, the drum is illustrated to be a substantially cylindrical surface. However, this disclosure is not limited to an apparatus with such a configuration, and is applicable to oval shapes, for example, as may be required in other structures such as engine fan cowls or aircraft frame structures, or any number of variations that may include a variable flange angle or areas where the flange transitions from being unformed or absent to areas that are formed. The disclosure is applicable to structures which are not continuous throughout a complete revolution and are merely sections of a structure. It is not necessary that the drum has any curvature at all, as the drum can be a flat surface, or have areas that curve concave or convex or both. In addition to the exemplary case component for a fan engine assembly for an aircraft disclosed herein, the apparatus and method of this disclosure can be utilized with components for other applications, including, for example, components for engine fan cowls, nacelle frames, and fuselage frames.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus for forming a flange, comprising:
   a laminate component having at least a first layer and a second layer in a first position relative to each other, the laminate component further having a main section and a first end;
   a drum supporting the laminate component;
   a diaphragm member extending between the drum and the laminate component, the diaphragm member overlapping the first end and at least a portion of the main section of the laminate component, the diaphragm member having a first end extending outside of the laminate component proximate to the first end of the laminate component;
   a forming tool having a forming edge and a forming surface angled relative to the drum, the forming tool selectively engaging the forming edge with the main portion of the laminate component proximate to the first end of the laminate component and opposite the diaphragm member and the drum, the forming tool having a clamping surface overlapping the laminate component, the drum, and the diaphragm member;
   wherein the first end of the diaphragm member is configured to move away from the drum and selectively engage the forming tool, the diaphragm member being configured to deform the first end of the laminate component away from the drum about the forming edge of the forming tool, the first and second layers of the laminate component being configured to displace to a second position relative to each other, the laminate component having a substantially uniform thickness between the first and second layers in the second position.

2. The apparatus of claim 1, further comprising a former member extending between the diaphragm member and the laminate component, the former member having a rigidity greater than each of the diaphragm member and the laminate component,
   wherein, when the first end of the diaphragm member moves away from the drum, the former member translates the movement of the diaphragm member to the laminate component to deform the first end of the laminate component about the forming edge of the forming tool.

3. The apparatus of claim 2, wherein the former member includes an elastomeric silicone material.

4. The apparatus of claim 1, further comprising a seal layer extending over the main section of the laminate component and between the forming tool and the drum,
   wherein the forming tool sealingly engages the laminate component and the diaphragm member relative to the drum, and the first end of the diaphragm member has a sealed selective engagement with the forming tool, wherein the forming tool, diaphragm member and drum define a sealed forming chamber therebetween encompassing the laminate component.

5. The apparatus of claim 4, further comprising a vacuum in fluid communication with the sealed forming chamber, the vacuum configured to selectively reduce the pressure in the chamber and the diaphragm member further deforming the first end of the laminate component away from the drum about the forming edge of the forming tool, the first and second layers of the laminate component displacing to a third position relative to each other, the laminate component having a substantially uniform thickness between the first and second layers in the third position.

6. The apparatus of claim 1, further comprising a mold plate selectively engaged with the forming tool and the drum, the mold plate cooperating with the forming tool and the drum to support the laminate component in a desired shape.

7. The apparatus of claim 6, wherein the laminate is cured with a resin.

8. The apparatus of claim 1, wherein the laminate component includes a composite material.

9. The apparatus of claim 8, wherein the composite material includes one of carbon fiber, aramid fiber, ceramic fiber, and glass fiber materials.

10. The apparatus of claim 8, wherein the laminate component includes a braided composite material.

11. The apparatus of claim 8, wherein the laminate component includes a woven composite material.

12. The apparatus of claim 1, wherein the laminate component is an engine case component.

13. An apparatus for forming a flange, comprising:
a laminate component having at least a first layer and a second layer in a first position relative to each other, the laminate component further having a main section and a first end;
a drum supporting the laminate component;
a diaphragm member extending between the drum and the laminate component, the diaphragm member overlapping the first end and at least a portion of the main section of the laminate component, the diaphragm member having a first end extending outside of the laminate component proximate to the first end of the laminate component;
a forming tool having a forming edge and a forming surface angled relative to the drum, the forming tool selectively engaging the forming edge with the main portion of the laminate component proximate to the first end of the laminate component and opposite the diaphragm member and the drum; and
a former member extending between the diaphragm member and the laminate component, the former member having a rigidity greater than each of the diaphragm member and the laminate component;
wherein the first end of the diaphragm member is configured to move away from the drum and selectively engage the forming tool, the diaphragm member being configured to deform the first end of the laminate component away from the drum about the forming edge of the forming tool, the first and second layers of the laminate component being configured to displace to a second position relative to each other, the laminate component having a substantially uniform thickness between the first and second layers in the second position; and
wherein when the first end of the diaphragm member moves away from the drum, the former member translates the movement of the diaphragm member to the laminate component to deform the first end of the laminate component about the forming edge of the forming tool.

14. The apparatus of claim 13, wherein the former member includes an elastomeric silicone material.

* * * * *